United States Patent [19]

Hirai et al.

[11] Patent Number: 4,983,145
[45] Date of Patent: Jan. 8, 1991

[54] APPARATUS FOR AUTOMATICALLY TENSIONING A DRIVE BELT

[75] Inventors: Hideo Hirai, Kakogawa; Masakatsu Ando, Kobe; Yasuhiro Hashimoto, Miki; Naoki Fujimoto, Kobe; Norikazu Tanaka, Osaka; Susumu Yamakawa, Kobe, all of Japan

[73] Assignee: Mitsuboshi Belting Ltd., Japan

[21] Appl. No.: 412,941

[22] Filed: Sep. 26, 1989

[30] Foreign Application Priority Data

Sep. 27, 1988 [JP] Japan .................... 63-243090

[51] Int. Cl.$^5$ .............................................. F16H 7/10
[52] U.S. Cl. ........................................ 474/117; 474/135
[58] Field of Search ............... 474/109, 110, 112, 117, 474/133, 135; 192/43, 45.1, 75, 76, 77, 78

[56] References Cited

U.S. PATENT DOCUMENTS

| | | | |
|---|---|---|---|
| 1,082,657 | 12/1913 | Smith | 192/76 |
| 1,153,556 | 9/1915 | Lindstrom | 192/75 |
| 3,202,251 | 8/1965 | Fulton | 192/45.1 |
| 3,468,403 | 9/1969 | Nasvytis | 192/76 |
| 3,994,377 | 11/1976 | Elmore | 192/45 |
| 4,270,906 | 6/1981 | Kraft et al. | 474/135 |
| 4,341,294 | 7/1982 | Kerr | 192/45 |
| 4,392,840 | 7/1983 | Radocaj | 474/117 |
| 4,557,709 | 12/1985 | St. John | 474/117 |

FOREIGN PATENT DOCUMENTS 2200429 8/1988 United Kingdom .

Primary Examiner—William P. Neuder
Attorney, Agent, or Firm—Wood, Phillips, Mason, Recktenwald & VanSanten

[57] ABSTRACT

An apparatus for tensioning a belt consisting of a tensioner arm having an idler pulley for engagement with a surface of a drive belt, structure for mounting the tensioner arm to a suppport for pivoting movement about a pivot axis in first and second opposite directions, and structure for biasing the tensioner arm in one of the first and second directions. The mounting structure includes first and second members with first and second relatively movable cooperating friction generating surface for damping rotation of the tensioner arm. At least a portion of one of the friction generating surfaces is concave opening towards the tensioner with at least one of the friction generating surfaces having at least a portion defined by other than a radius centered on the pivot axis of the tensioner arm to thereby produce a greater resistance to rotation of the tensioner arm in the other of the first and second directions than in the one of the first and second tensioner arm pivoting directions.

29 Claims, 3 Drawing Sheets

APPARATUS FOR AUTOMATICALLY TENSIONING A DRIVE BELT

BACKGROUND OF THE INVENTION

1. Field of the Invention

This invention relates to drive belt tensioning apparatus and, more particularly, to a device having a pivotable tensioner arm which is biased against a drive belt to produce a predetermined tension thereon and to a damping mechanism for controlling pivoting of the tensioner arm to avoid tensioner arm backlash and the generation of detrimental system vibrations.

2. Background Art

It is conventional to simultaneously operate automobile accessories, such as pumps, alternators, air conditioning systems, etc., by a single endless drive belt that is configured in a serpentine arrangement around the ends of drive shafts for those accessories. For the accessories to operate consistently and effectively, it is necessary for the belt to be maintained at a predetermined tension. This controlled tensioning is conventionally accomplished by biasing an idler pulley against an unsupported portion of the belt between drive and driven pulleys. The bias may be developed by hydraulic pressure, air pressure, a rubber spring, a steel spring, a resin spring, or the like. Belt tension is controlled by moving the belt in tension, compression, or in a twisting manner.

An exemplary prior art belt tensioner is shown in U.S. Pat. No. 4,285,676, to Kraft. In Kraft, a tensioner arm 27 is attached for pivoting movement relative to a fixed support. The tensioner arm 27 carries at its end a rotatable idler pulley 32 which, as seen in FIG. 1, is borne against an unsupported portion of a drive belt 2 between a drive pulley 4 and a driven pulley 5. The tensioner arm 27 has a mounting hub 28 which surrounds a shaft 21 and rotates relative thereto. Torsional coil springs 38, 39 surround the hub 28 and act between the torsion arm and fixed support to exert a rotational bias on the tensioner arm 27 to thereby bear the idler pulley 32 with a predetermined force against the belt 2.

It is the objective of designers of belt tensioning systems, such as that in Kraft, to afford a system that responds abruptly to belt slackening to prevent interruption of accessory operation by reason of belt slippage and/or disengagement of the belt from the accessories. However, while it is desirable to increase belt tension abruptly, it is also desirable to gradually reduce belt tension applied through the tensioning apparatus in the event that there is an abrupt increase in belt tension, as at start-up or upon rapid acceleration of a vehicle engine. Belt designers thus contend with the competing objectives of rapidly increasing belt tension in response to belt slackening and limiting kickback of an idler pulley and associated tensioner arm in response to an abrupt tensioning of the belt.

The Kraft structure achieves the first objective, but not the latter. If the belt portion between the drive and driven pulleys in Kraft is abruptly tensioned so as to overcome the predetermined biasing force produced by the tensioner arm, the belt will cause kickback of the tensioner arm 27.

One attempted solution to this problem is disclosed in U.S. Pat. No. 4,473,362, to Thomey et al. Thomey et al use a brake band 61 to create friction that varies depending upon the loading of the coil spring 20. The Thomey et al system is relatively complicated to construct. Further, the damping force will change in the event that there is a variation in the characteristics of the spring 20. Further, coil springs tend to deform as they are loaded by twisting, which results in uneven and generally unpredictable damping on the tensioner arm.

Other structures which damp tensioner arm rotation with a force controlled by a coil spring, which also pivotably biases the tensioner arm, are shown in U.S. Pat. Nos. 4,473,362, to Thomey et al, and 4,557,707, to Thomey.

Another vexatious problem in the drive belt industry is the development of detrimental vibrations that occur in drive systems, such as that described above. This problem is particularly prevalent in systems wherein a plurality of shafts are driven by a long drive belt. A resonant condition may result in the belt and/or the tensioning apparatus. Due to abrupt changes in angular velocity in automobile engines, severe vibrations of the belt may occur, resulting in generation of noise, variation in the tension on the belt developed through the belt tensioner, or disengagement of the belt altogether from the surface(s) which it drives.

The resonant condition in the belt tensioner may result in fluctuation of the belt tension as well as variation in the torque produced by the belt on the load/accessories. A further adverse effect of this vibration is that the belt may intermittently disengage from the accessories which it is driving. This may occasion uneven belt wear and premature failure of the belt.

In spite of the problems of belt and tensioner system vibration, few prior art structures have taken any measures to prevent such vibrations.

SUMMARY OF THE INVENTION

The present invention is specifically directed to overcoming the above-enumerated problems in a novel and simple manner.

The principal objectives of the present invention are to produce a constant, predetermined tension on a drive belt while minimizing vibrations of the belt and tensioning apparatus imparted through the belt drive mechanism.

More specifically, the invention contemplates an apparatus for tensioning a belt consisting of a tensioner arm having an idler pulley for engagement with a surface of a drive belt, structure for mounting the tensioner arm to a support for pivoting movement about a pivot axis in first and second opposite directions, and structure for biasing the tensioner arm in one of the first and second directions. The mounting structure includes first and second members with first and second relatively movable cooperating friction generating surfaces for damping rotation of the tensioner arm. At least a portion of one of the friction generating surfaces is concave opening towards the tensioner arm pivot axis with at least one of the friction generating surfaces having at least a portion defined by other than a radius centered on the pivot axis of the tensioner arm to thereby produce a greater resistance to rotation of the tensioner arm in the other of the first and second directions than in the one of the first and second tensioner arm pivoting directions.

The friction generating surfaces progressively wedge against each other upon the tensioner arm being pivoted in the other of the first and second directions. Pivoting of the tensioner arm in the one of the first and second directions progressively reduces damping to the point that pivoting is substantially uninhibited by the cooperating friction generating surfaces.

In a preferred form, one of the first and second members is cylindrical and surrounds the pivot axis of the tensioner arm. The friction producing surfaces on the members are in radially facing relationship. One of the first and second members follows movement of the tensioner arm and the other member is fixed against rotation relative to a support on which the tensioner arm is mounted.

The result is a positive and consistent damping through the friction generating surfaces in response to pivoting of the tensioner arm through the entire pivoting range of the tensioner arm.

The one friction generating surface can take any of a number of different configurations. For example, the surface may, in cross section, be a circle centered on other than the pivot axis of the tensioner arm, an involute of a circle, a cycloid, a spiral shape, etc.

Preferably, the one friction generating surface is defined by a plurality of circular arcs centered on points spaced from the pivot axis of the tensioner arm. The circular arcs define a stepped surface configuration with circumferentially facing stop shoulders defined between adjacent arcs. While any number of arcs can be utilized, three or four such arcs are preferred to thereby create a like number of stop shoulders.

Another aspect of the invention is the provision of structure to positively limit pivoting movement of the tensioner arm in the other of the first and second directions.

In a preferred form, the other of the friction generating surfaces is defined by at least one arcuate wall segment extending through less than 90°. Preferably, diametrically opposed wall segments, extending through approximately 60°, are provided and define the other of the friction generating surfaces. Each wall segment has an edge with a circumferentially facing shoulder. The shoulders on the wall segments cooperate with the shoulders defined between adjacent circular arcs on the one friction generating surface. Preferably, there are two shoulders defined by the wall segments which simultaneously engage a like number of shoulders on the one friction generating surface to positively limit pivoting movement of the tensioner arm in the other of the first and second directions.

The invention also contemplates axial slits in the wall segments to allow radial deflection at least part of the wall segments to prevent lockup between the first and second members as the first and second friction generating surfaces act against each other.

Another aspect of the invention is the provision of structure to avoid vibration propagation that might produce a resonant condition. To accomplish this, the first and second members have cooperating axially facing surfaces. One or both of the axially facing surfaces can be planar and at right angles to the pivot axis for the tensioner arm. The axially facing surfaces could have other configurations, such as spiral, etc., to increase contact area.

In a preferred form, one of the members is axially movable and biased, as by a spring, so as to bring the axially facing surface thereon into engagement with the other axially facing surface on the other member.

DETAILED DESCRIPTION OF THE DRAWINGS

Figure 1:
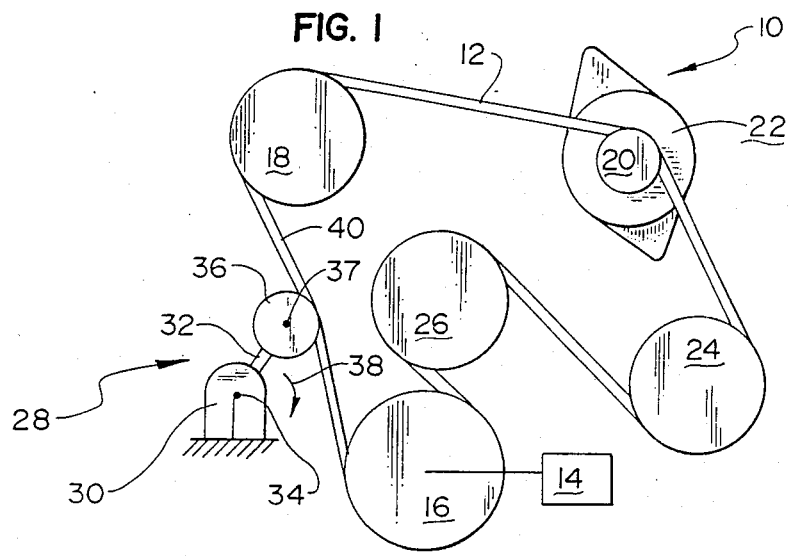
FIG. 1 is a schematic representative of a serpentine belt system on an automobile with a belt tensioning apparatus according to the present invention incorporated therein.
Figures 3, 4:
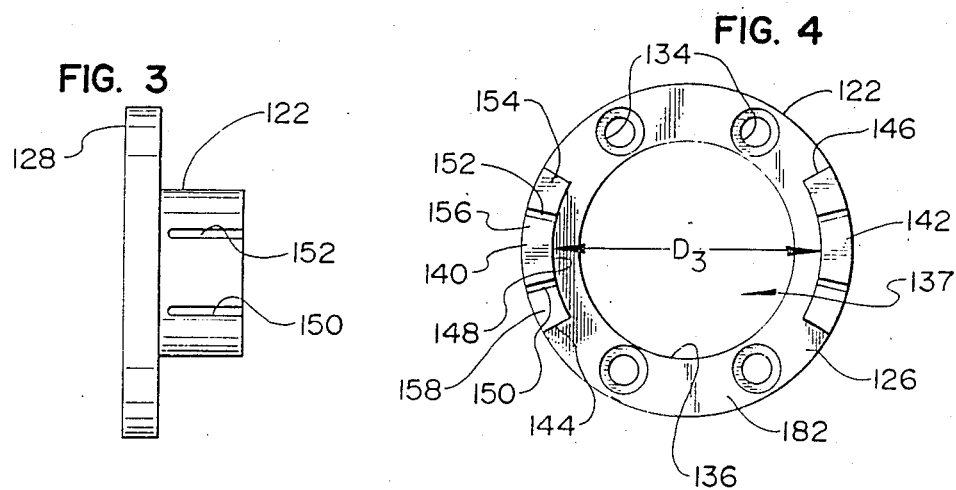
FIG. 3 is a reduced side elevation view of one of two cooperating member used to create a damping force in the belt tensioning apparatus of FIG. 2.
FIG. 4 is a reduced end view of the damping member of FIG. 3.

An exemplary system with which an automatic belt tensioner, according to the present invention, can be incorporated, is shown in FIG. 1 at 10. The system 10 is what is generally characterized as a serpentine belt system wherein a single, endless belt 12 drives, in this system, four separate automobile accessories. An engine 14 operates, through a drive shaft (not shown), a driving pulley 16 which, through belt 12, drives a pulley 18 which is operatively connected to an air pump (not shown), a pulley 20 on an alternator 22, a pulley 24 on a shaft which operates a power steering unit (not shown), and a pulley 26 operatively connected to the shaft of a water pump (not shown) for the engine 14.

The belt tensioner, shown schematically in FIG. 1 at 28, has a fixed support 30 to which a tensioner arm 32 is attached for pivoting movement in first and second opposite directions about a pivot axis 34. The tensioner arm 32 carries at its end an idler pulley 36 that is rotatable about an axis 37 that is parallel to the tensioner arm pivot axis 34. The tensioner arm 32 is biased in the direction of arrow 38 to resiliently bias the idler pulley 36 against the unsupported belt portion 40 between the driving pulley 16 and driven pulley 18, with a force calculated to cause a constant predetermined tension to be applied to the belt 12.

The present invention contemplates that the bias exerted by the idler pulley 36 on the belt 12 be constant. In the event of an abrupt slackening of the belt portion 40, the idler pulley 36 will be driven abruptly against the belt portion 40 to take up any slack that is developed, to thereby maintain the belt tension. This prevents inadvertent disengagement of the belt 12 from any of the pulleys 16, 18, 20, 24, 26. By maintaining a predetermined belt force to thereby cause a constant drive force to be exerted on the driven pulleys, belt wear, which might occur through inadvertent separation of the belt 12 from the pulleys, is minimized.

At the same time, at startup of the engine 14 and the driving pulley 16, there is a tendency of the belt portion 40 to thrust the idler pulley 36 so as to pivot the tensioner arm 32 opposite to the direction of arrow 38. Abrupt movement of the tensioner arm 32 opposite to the direction of arrow 38 is undesirable and is prevented by the structure of the present invention, as described in detail below.

One form of belt tensioning apparatus, according to the present invention, is shown in FIGS. 2–6 and identified generally at 42. The belt tensioning apparatus 42 is shown mounted on fixed support 44. The belt tensioning apparatus 42 has a tensioner arm 46 which is attached for pivoting movement relative to the support 44 about an axis 48. The tensioner arm 46 carries on its one end 50 an idler pulley 52 journalled for rotation relative to the tensioner arm end 50 about an axis 54, that is parallel to the axis 48 about which the tensioner arm 46 pivots. The idler pulley 52 is mounted on a ball bearing 56, which smoothly guides its rotation. The peripheral surface 58 of the idler pulley 52 is pressed directly against a belt to thereby produce a predetermined tension thereon.

To mount the tensioner arm 46, a cup-shaped mounting flange 62 is employed The mounting flange 62 has a wall 63 with a flat surface 64 that is facially engaged with a flat surface 66 on the support 44. The wall 63 has a through bore 68 which closely receives a tensioner arm mounting shaft 70. The mounting shaft 70 has a through bore 72 which closely accepts a mounting bolt 74 which passes axially through a stepped bushing 76 and the bore 72 in the mounting shaft 70 and into a threaded bore 78 in the support 44. An axially facing surface 80 on the bolt head 82 bears the bushing 76 rigidly and captively against the mounting shaft 70. An annular shoulder 84, on the mounting shaft 70, captively maintains the mounting flange wall 63 against the support 44 whereby a rigid assembly is provided for mounting the tensioner arm 46.

The tensioner arm 46 has a mounting portion/hub at 86 with a stepped inner wall 88 surrounding the mounting shaft 70 and a peripheral, cylindrical outer wall 90. A bushing 92, with a radially outturned peripheral flange 94, is interposed between the inner wall 88 of the tensioner arm 46 and the outer surface 96 of the mounting shaft 70, to smoothly guide rotation of the tensioner arm 46 with the attached idler pulley 52 about the mounting shaft 70.

The tensioner arm 46 is torsionally biased in the direction of arrow 98 by a coil spring 100, which resides in a space 102 defined cooperatively by the mounting portion 86 of the tensioner arm 46 and the mounting flange 62. The coil spring 100 has opposite ends 104, 106 connected respectively to the mounting flange 62 and mounting portion 86 of the tensioner arm 46. The spring end 104 extends radially through a bore 108 in the mounting flange 62. The opposite spring end 106 extends through a radial bore 110 in the outer wall 90 of the mounting portion 86 of the tensioner arm 46. The connection of the spring ends 104, 106, as described, permits the spring 100 to be loaded by relative rotation between the tensioner arm 46 and support 44 about axis 48 whereby a torsional force in the direction of arrow 98 is developed on the tensioner arm 46.

The spring 100 serves the additional function of controlling the axial position of the tensioner arm mounting portion 86. The spring 100 bears between an axially facing surface 112 on the support flange 62 and an axially oppositely facing surface 114 on the mounting portion 86 of the tensioner arm 46 to thereby bias the mounting portion 86 axially towards the right in FIG. 2 so that an axially facing surface 116 on the mounting portion 86 bears against the bushing flange 94 which in turn is resiliently biased against the fixed axially facing surface 117 on a radially extending flange 118 on the bushing 76.

Figure 2:
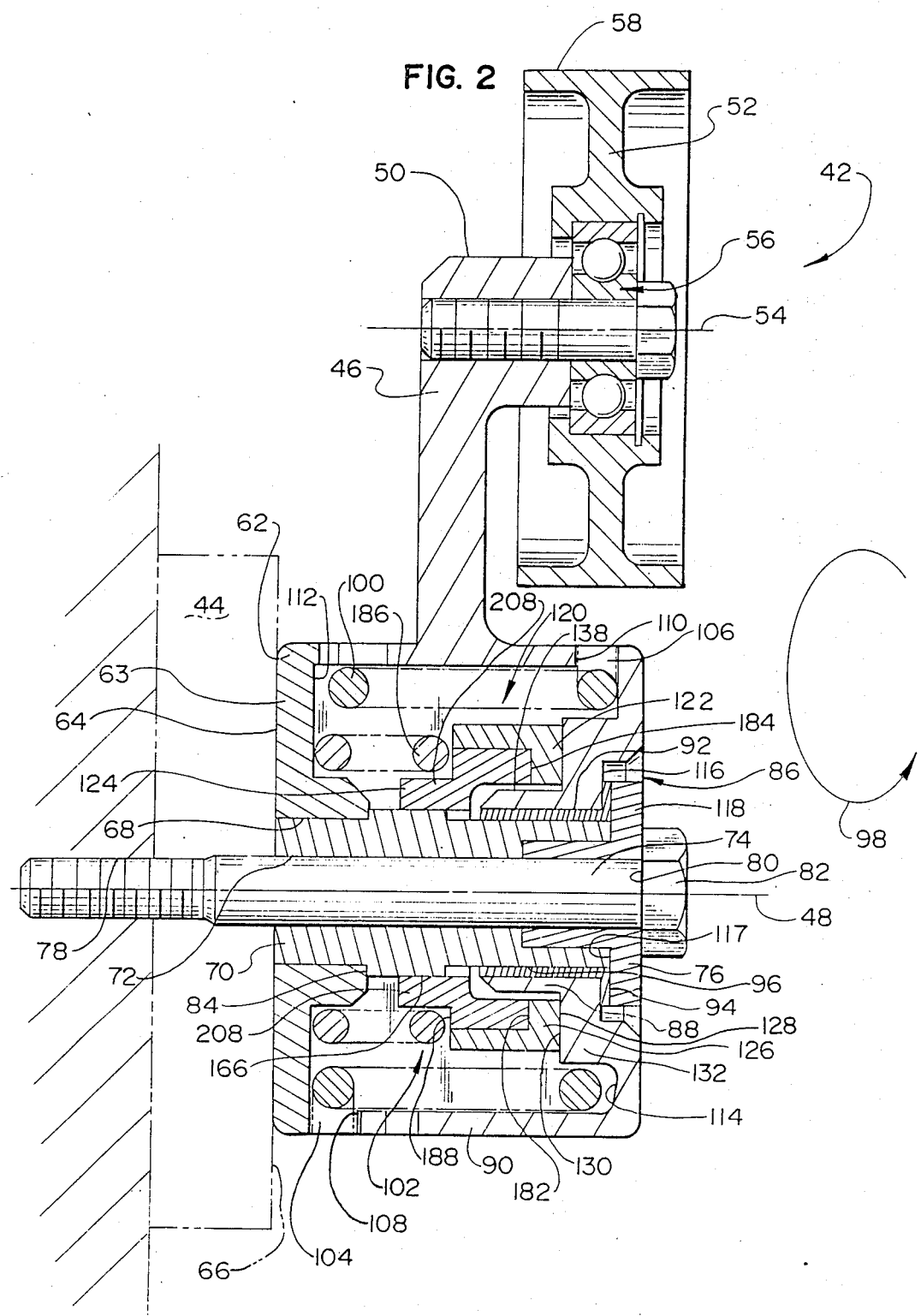
FIG. 2 is a side elevation view in section of a belt tensioning apparatus according to the present invention.

The present invention is concerned with damping structure, shown at 120 in FIG. 2, which causes a progressively increasing resistance to movement of the tensioner arm 46 in a rotational direction opposite to that shown by the arrow 98 in FIG. 2 i.e. away from a belt tensioning direction. The damping structure consists of first and second cooperating members 122, 124, which surround the mounting shaft 70 and reside in both radially and axially overlapping relationship with each other.

The first member 122 consists of a ring-shaped flange 126 with a flat surface 128 that is bolted against a surface 130 on a radially extending wall 132 connecting between the inner wall 88 and outer wall 90 of the mounting portion 86 of the tensioner arm 46. The flange 126 has a plurality of bores 134 therethrough to accept a corresponding number of bolts (not shown). The diameter of the circular inside surface 136 bounding the opening 137 in flange 126 is slightly larger than the diameter of the annular surface 138 on the mounting portion 86 which it surrounds so that a slight space is maintained between the surfaces 136, 138.

The member 122 has two diametrically opposed wall segments 140, 142 projecting axially therefrom, and to the left in FIG. 2 from the flange 126. Each wall segment 140, 142 extends through less than 90°, and preferably through approximately 60°, and has circumferentially facing stopping shoulders 144, 146 respectively at the ends thereof. Since each wall segment 140, 142 is the same, the description herein will be limited to exemplary wall segment 140. The wall segment 140 has a radially inwardly facing friction generating surface 148 with a diameter D3 slightly larger than the diameter of the surface 136 on the flange 126.

The wall segment 140 has axially extending slots 150, 152 therethrough which divide the wall segment 140 into a plurality of comb-like fingers 154, 156, 158, which are deflectable slightly radially, for reasons that will be described later. The invention, however, also contemplates a continuous cylindrical wall in place of the separate segments 140, 142.

Figures 5, 6:
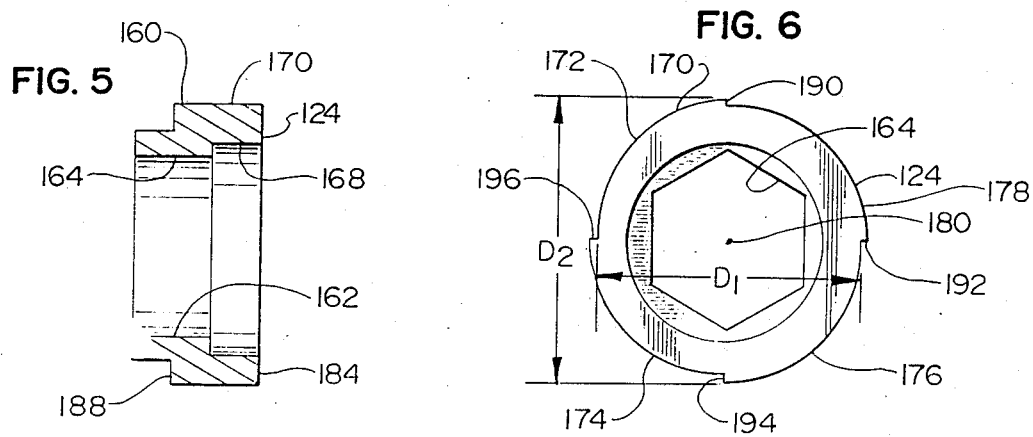
FIG. 5 is a reduced side elevation view in section of the other cooperating damping member in the belt tensioning apparatus of FIG. 2.
FIG. 6 is a reduced end view of the damping member of FIG. 5.

The member 124 is generally cylindrical in configuration and has a stepped outer surface 160 and a stepped internal through bore 162. The one section 164 of the bore 162 has a hexagonal cross section, as seen in FIG. 6, and is thereby keyed to a correspondingly configured section 166 on the mounting shaft 70, which is directed therethrough, so that the member 124 is movable axially relative to the mounting shaft 70 but fixed against rotation relative thereto. The larger diameter section 168 of bore 162 has a diameter approximately equal to the diameter of surface 136 on the member 122 so as to be slidable axially over the annular surface 138 on the mounting portion 86 of the tensioner arm 46.

With the members 122, 124 in operative position, as shown in FIG. 2, a peripheral friction generating surface 170 on member 124 axially aligns with the friction generating surface 148 on the wall segments 140, 142. The friction generating surface 170 is defined by a plurality of circular arcs 172, 174, 176, 178 defined by the same radii with centers spaced from each other and the central axis 180 of the member 124. A stepped outer surface 170 results with a first diameter D1 between the radially innermost points of two diametrically opposed arcs 172, 176 and a second, larger diameter D2 between the radially outermost points of the same arcs 172, 176.

The diameter D3 of the friction generating surface 148 is dimensioned to be less than the diameter D2 but greater than the diameter D1.

In operation, the member 124 is fixed against rotation relative to the mounting shaft 70. As the tensioner arm 46 rotates about the axis 48, the friction generating surface 148 on the member 122 acts against the friction generating surface 170 on member 124. Movement of the tensioner arm 46 in a tensioning direction, as indicated by arrow 98 in FIG. 2, causes the friction generating surface 148 to travel in a counterclockwise position relative to the surface 170, as seen in FIG. 6. In other words, as this occurs, the surface 148 moves progressively to an effectively smaller diameter portion of the member 124 so that the damping force decreases to a point that it is minimal.

Pivoting of the tensioner arm 46 opposite to the direction of tensioning causes the friction generating surface 148 to travel from a position on the member 124 with an effective diameter D1 to one with a progressively increasing diameter, approaching the diameter D2. As this occurs, a wedging action is developed between the friction generating surfaces 148, 170. The result of this is that pivoting of the tensioner arm 46 away from the tensioning position causes a progressively increasing damping force to be developed by the cooperating friction generating surfaces 148, 170.

It should be noted that eccentric friction generating surfaces could be provided on both members 122, 124 or on the member 122 instead of the member 124.

The provision of the slots 150, 152 in the wall segment 140 permits the fingers 154, 156, 158 to deflect radially outwardly under the camming action of the friction generating surface 170. This prevents lockup between the members 122, 124.

To prevent detrimental oscillations in the tensioner system 10, cooperating, axially facing surfaces 182, 184 are provided on the members 122, 124, respectively. A coil spring 186 is interposed between the surface 112 and an axially facing annular surface 188 on the member 124 so that the member 124 is normally biased axially to the right in FIG. 2, thereby bringing the surfaces 182, 184 into abutting relationship. The result is that there is damping in both a radial and axial direction effected between the members 122, 124. The surfaces 182, 184 may be planar and at right angles to the pivot axis 48. One or the other of the surfaces 182, 184 may otherwise be spiral-shaped, inclined, etc. to more effectively suppress resonance.

It is another aspect of the invention to provide cooperating structure on the members 122, 124 to limit pivoting movement of the tensioner arm 46. In the tensioning direction, i.e. in the direction of arrow 98 in FIG. 2. The arcs 172, 174, 176, 178 on the friction generating surface 170 on the member 124 produce a stepped configuration with circumferentially facing shoulders 190, 192, 194, 196 defined between adjacent arcs 172, 174, 176, 178. Upon the tensioner arm 46 rotating oppositely to the arrow 98 in FIG. 2, the shoulders 144, 146 on the member 122 simultaneously engage diametrically opposed shoulders, either 190, 194 or 192, 196 to thereby arrest further rotation of the element 122 relative to the element 124. Simultaneous engagement of multiple shoulders assures a positive arresting of the tensioner arm pivoting.

It should be understood that while two wall segments 140, 142 are shown on element 122 and four arcs 172, 174, 176, 178 define the surface 170, variations in the configuration and number of these elements is contemplated by the invention. In its simplest state, the structure need have only one wall segment 140, 142. Any number of eccentric arcs 172, 174, 176, 178 can be provided to define the surface 170. Further, the surface 170 need not be continuous. It suffices that a camming action is developed between the members 122, 124 through the contemplated range of movement of the tensioner arm 46 to prevent backlash.

Figure 7:
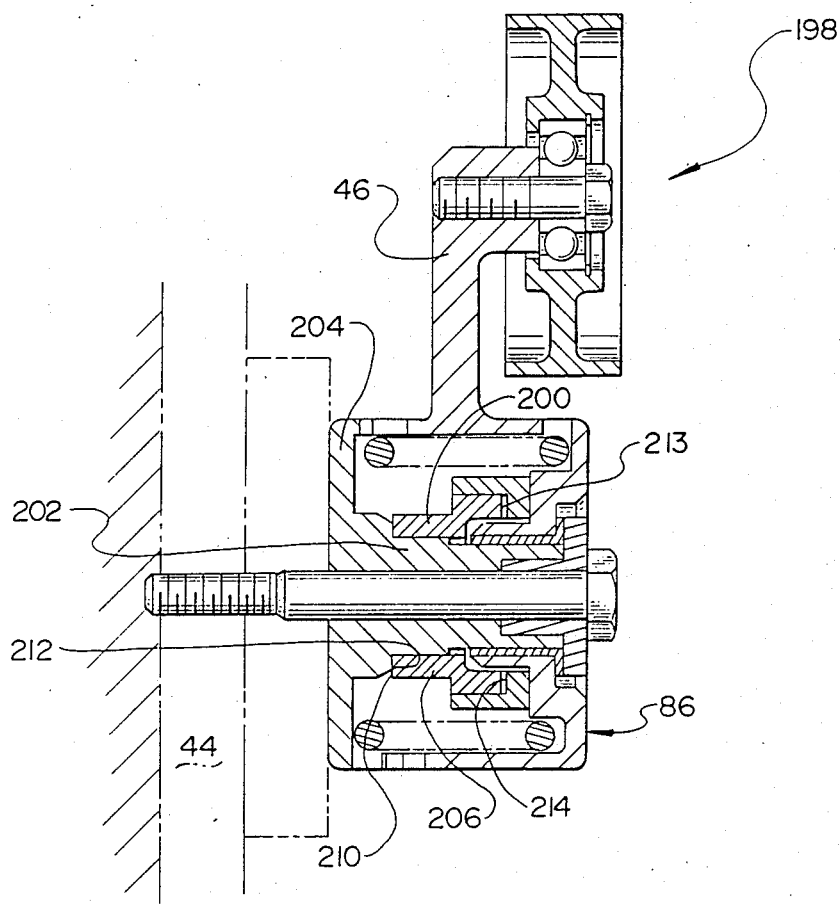
FIG. 7 is a side elevation view in section of a modified form of belt tensioning apparatus according to the present invention.

A modified form of belt tensioning apparatus, according to the present invention, is shown at 198 in FIG. 7. The tensioning apparatus 198 is substantially the same as the apparatus 42 shown in FIG. 2. The principal difference is that the member 200, corresponding to the member 124 in FIG. 2, is fixed both axially and rotationally relative to the tensioner arm mounting shaft 202. The shaft 202 is integrally formed with a mounting flange 204 secured against the fixed support 44. The member 200 can be integrally constructed with the mounting shaft 202 or may be fused with, or blocked in position on, the mounting shaft 202.

The member 200 has a body 206 with a greater axial extent than the corresponding body 208 (FIG. 2) on the member 124. The axial end 210 of the body 206 abuts a shoulder 212 on the shaft 202. The compression spring 186 in the FIG. 2 embodiment is thus eliminated. A slight spacing is maintained between the axial end 213 of the member 200, at the right of FIG. 7, and the axially facing surface 214 on the mounting portion 86 of the tensioner arm 46.

Figure 8:
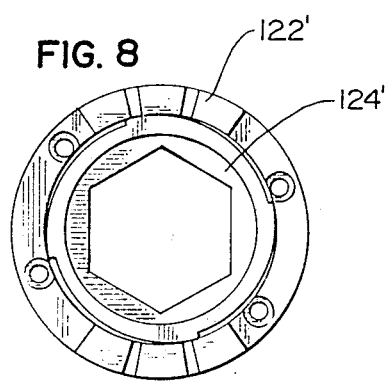
FIG. 8 is an end view of further modified forms of cooperating damping members in assembled relationship.
Figure 9:
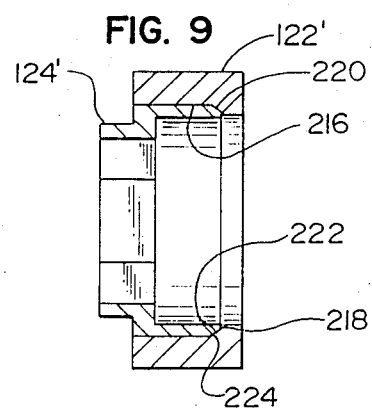
FIG. 9 is a side elevation view in section of the assembled cooperating damping members of FIG. 8.

FIGS. 8 and 9 show two views of modified forms of the members 122, 124, which will be identified as 122', 124'. The member 124' nests within a bore 216 in the member 122', as in the FIG. 2 embodiment. The difference is that the annular edge 218 of member 124', which is in a leading position as the members 122' and 124' are assembled, has a chamfer 220. The member 122' has a complementary inclined annular surface 222 to facially abut the surface 224 defined by the chamfer 220.

The damping members 122, 124, 200, 122', 124' can be made of any of a number of materials, including steel, aluminum, copper alloy, and other metals, as well as well-known synthetic resins such as nylon, fluoresin, phenol resin, etc. Preferably, the members 122, 122' are made of steel and the cooperating members 124, 124', 200 are made of cast nylon.

The foregoing disclosure of specific embodiments is intended to be illustrative of the broad concepts comprehended by the invention.

We claim:

1. An apparatus for tensioning a drive belt, said tensioning apparatus comprising:
   a tensioner arm having an idler pulley for engagement with a surface of a drive belt;
   means for mounting the tensioner arm to a support for pivoting movement about a pivot axis in first and second opposite directions; and
   means for biasing the tensioner arm in one of said first and second directions,
   said mounting means including first and second members with first and second relatively movable cooperating friction generating cam surfaces, said cam surfaces being in direct contact with each other for damping rotation of the tensioner arm,
   at least a portion of one of said friction generating surfaces being concave opening towards the tensioner arm pivot axis, at least one of said friction generating surfaces having at least a portion defined by other than a radius centered on the pivot axis of the tensioner arm to act directly against the other of the friction generating surface, thereby defining means for producing a resistance to rotation of the tensioner arm that increases progressively as the tensioner arm moves in the other of said first and second directions.

2. The belt tensioning apparatus according to claim 1 wherein one of said first and second members is cylindrical and surrounds the pivot axis of the tensioner arm.

3. The belt tensioning apparatus according to claim 1 wherein one of said first and second members follows pivoting movement of the tensioner arm and the other member is fixed against rotation relative to a support on which the tensioner arm is mounted.

4. The belt tensioning apparatus according to claim 1 wherein at least one of said friction generating surfaces is defined by a plurality of circular arcs centered on points spaced from the pivot axis of the tensioner arm.

5. The belt tensioning apparatus according to claim 1 wherein said cooperating friction generating surfaces are radially facing surfaces, and the first and second members have axially facing surfaces which cooperate with each other to damp pivoting of the tensioner arm and prevent detrimental oscillation of the belt tensioning apparatus.

6. The belt tensioning apparatus according to claim 1 wherein said first and second members have cooperating means for limiting pivoting movement of the tensioner arm in the other of the first and second directions 7. The belt tensioning apparatus according to claim 4 wherein a first shoulder is defined on said one friction generating surface between first and second of said circular arcs and the member having the other of the surfaces defines a second shoulder, said first and second shoulders abutting to limit pivoting movement of the tensioner arm in one of the first and second directions.

8. The belt tensioning apparatus according to claim 5 wherein one of the first and second members is movable axially relative to the other of the first and second members and means are provided for biasing the one member axially towards the other member to bear the axially facing surfaces against each other.

9. The belt tensioning apparatus according to claim 8 wherein the other of the friction generating surfaces is defined by at least one arcuate wall segment extending through less than 90°.

10. The belt tensioning apparatus according to claim 9 wherein said wall segment has at least one axial slot therein to allow radial deflection of at least part of said wall segment as said friction generating surfaces on the first and second members act against each other to prevent lockup between the first and second members.

11. The belt tensioning apparatus according to claim 9 wherein the other of the friction generating surfaces is defined by diametrically opposed arcuate wall segments extending through less than 90°.

12. The belt tensioning apparatus according to claim 11 wherein each wall segment has a circumferentially facing shoulder, the one of the friction generating surfaces has diametrically opposed circumferentially facing shoulders and the shoulders on the one friction generating surface simultaneously abut the shoulders on the wall segments to limit pivoting movement of the tensioner arm in one of the first and second directions.

13. An apparatus for tensioning a drive belt, said tensioning apparatus comprising:

a tensioner arm having an idler pulley thereon for engagement with a surface of a drive belt;

a support;

means for mounting the tensioner arm to the support for pivoting movement about a pivot axis in first and second opposite directions relative to the support; and means for biasing the tensioner arm in one of said first and second directions, said mounting means includes means operating independently of said biasing means for damping rotation of the tensioner arm in the other of said first and second directions to that there is greater resistance to rotation of the tensioner arm in the other of the first and second directions than in the one of the first and second directions, said damping means including first and second members with cooperating first and second friction generating cam surfaces on the first and second member, said cam surfaces being in direct contact with each other for damping rotation of the tensioner arm, at least one said first and second friction generating surfaces having a generally cylindrical configuration, said cam surfaces defining means for producing a resistance to rotation of the tensioner arm that increases progressively as the tensioner arm moves in the other of said first and second directions.

14. The belt tensioning apparatus according to claim 13 wherein one of said first and second members follows pivoting movement of the tensioner arm in each of said first and second directions and the other of the cooperating members is fixed against rotation with respect to a support on which said tensioner arm is mounted.

15. The belt tensioning apparatus according to claim 13 wherein said damping means includes cooperating axially facing surfaces on the first and second members.

16. The belt tensioning apparatus according to claim 13 including cooperating means on the first and second members for limiting pivoting movement of the tensioner arm in the other of the first and second directions.

17. The belt tensioning apparatus according to claim 13 wherein one of said first and second friction generating surfaces is defined by a plurality of circular arcs having centers spaced from the pivot axis of the tensioner arm.

18. The belt tensioning apparatus according to claim 13 wherein one of said first and second friction generating surfaces has a circular configuration with the center thereof spaced from the pivot axis of the tensioner arm.

19. The belt tensioning apparatus according to claim 13 wherein one of said first and second friction generating surfaces has a spiral configuration.

20. The belt tensioning apparatus according to claim 13 wherein one of said first and second members has a wall defining one of the friction generating surfaces and the wall has at least one axial cut therein to permit radial deflection of at least part of the wall to prevent lockup between the first and second members as the first and second friction generating surfaces act against each other.

21. The belt tensioning apparatus according to claim 13 wherein the other of the first and second friction generating surfaces has a right cylindrical configuration.

22. The belt tensioning apparatus according to claim 15 including means for biasing the axially facing surfaces against each other.

23. The belt tensioning apparatus according to claim 16 wherein said limiting means comprises a shoulder on each of the first and second members, said shoulders abutting each other to limit pivoting of the tensioner arm.

24. The belt tensioning apparatus according to claim 22 wherein said axially facing surfaces are each substantially planar and extend at right angles to the pivot axis for the tensioner arm.

25. The belt tensioning apparatus according to claim 22 wherein at least one of the axially facing surfaces is other than a planar surface at right angles to the pivot axis for the tensioner arm.

26. An apparatus for tensioning a drive belt, said tensioning apparatus comprising:
a tensioner arm;
means for mounting the tensioner arm to a support for pivoting movement in first and second opposite directions about a pivot axis; and
means for biasing the tensioner arm in one of said first and second directions,
said mounting means including means for damping rotation of the tensioner arm so that the resistance to pivoting of the tensioner arm in the other direction is greater than the resistance to rotation in the one direction,
said damping means further including a first radially facing friction generating surface fixed with respect to a support on which the tensioner arm is mounted and a second radially facing friction generating surface following movement of the tensioner arm in both said first and second directions and acting directly against the first surface to produce a damping force on the tensioner arm,
one of said first and second friction generating surface defined by a cylindrical member surrounding the tensioner arm pivot axis,
at least one said friction generating surface defined by other than an arc of constant radius centered on the pivot axis for the tensioner arm,
said friction generating surfaces acting directly against each other and thereby defining means for producing a resistance to rotation of the tensioner arm that increases progressively as the tensioner arm moves in the other of said first and second directions.

27. The belt tensioning apparatus according to claim 26 wherein one of the friction generating surfaces is defined by an arc of a circle centered on the tensioner arm pivot axis.

28. An apparatus for tensioning a drive belt, said tensioning apparatus comprising:
a tensioner arm;
means for mounting the tensioner arm to a support for pivoting movement in first and second opposite directions about a pivot axis; and
means for biasing the tensioner arm in one of said first and second directions,
said mounting means including means for damping pivoting of the tensioner arm,
said damping means further including a first cylindrical member and a cooperating member,
said cylindrical member having a radially inwardly facing friction generating surface,
said second member having a friction generating surface that acts directly against the first generating surface on the cylindrical member to produce a damping force in response to pivoting of the tensioner arm,
said friction generating surfaces acting directly against each other, thereby defining means for producing a resistance to rotation of the tensioner arm that increases progressively as the tensioner arm moves in the other of said first and second directions.

29. The belt tensioning apparatus according to claim 28 wherein one of said cylindrical member and second member has a chamferred edge at an axial end thereof and the other of the cylindrical member and second member has a complementary surface to seat the chamferred edge.

* * * * *